United States Patent [19]
Lookingbill

[11] Patent Number: 5,343,829
[45] Date of Patent: Sep. 6, 1994

[54] DEVICE FOR PREVENTING HORSE WIND SUCKING

[76] Inventor: Leonard L. Lookingbill, 401 Apple Dr., Bath, Pa. 18014

[21] Appl. No.: 44,750

[22] Filed: Apr. 12, 1993

[51] Int. Cl.$^5$ .................. A01K 13/00; B68B 1/00
[52] U.S. Cl. .................................. 119/821; 54/71
[58] Field of Search .............. 54/19.3, 21, 57, 59, 54/71, 80.1; 119/821

[56] References Cited

U.S. PATENT DOCUMENTS

| | | | |
|---|---|---|---|
| 84,687 | 12/1868 | Force et al. | 54/21 |
| 131,925 | 10/1872 | Wright | 54/19.3 |
| 1,603,222 | 10/1926 | Transue | 54/71 X |

Primary Examiner—Robert P. Swiatek
Attorney, Agent, or Firm—Ilya Zborovsky

[57] ABSTRACT

A device for preventing horse wind sucking has a main part which includes two side portions provided with upwardly open cavities to fit horse jawbones and a central part adapted to apply inward and upward pressure to a horse throat so as to inhibit horse throat movements during attempts of wind sucking.

11 Claims, 2 Drawing Sheets

DEVICE FOR PREVENTING HORSE WIND SUCKING

BACKGROUND OF THE INVENTION

A patent application which is a continuation of the present application and has claims of a different scope has been filed —.

The present invention relates to a device for preventing horse wind sucking.

It is known that when young horses bite on a piece of wood or metal, they aggresively suck air and develop an action which resembles human hiccups and is identified as wind sucking or cribbing. If not taken care of, this becomes a horse's habit which can last for a long time. The horse's larynx and windpipe swell, the horse develops stomach convulsions, its intestine is entangled, resulting in a sometimes grave outcome. In order to prevent the wind sucking, a device has been proposed, which is formed as a single straight strap surrounding the horse throat and, when tightened, applying an inward pressure to the throat and larynx so that the horse cannot develop the above mentioned habit. The disadvantage of this device is that when it is tightened it can choke the horse. Also, it causes injuries to the horse due to rubbing, and after some time sores develop in corresponding areas.

INVENTION

Accordingly it is an object of the present invention to provide a device for preventing horse wind sucking, which avoids the disadvantages of the prior art.

In keeping with these objects and with others which will become apparent hereinafter, one feature of the present invention resides, briefly stated, in a device for preventing horse wind sucking which has a main part applicable to an outer surface of a horse throat and including two side portions provided with upwardly open cavities by which the main part can be guided under the horse jawbones, and a central portion located between the side portions and extending upwardly so as to apply an inward and upward pressure to the horse throat, and means for reliably fixing the main part to the horse.

When the device is designed in accordance with the present invention, the inward and upward pressure forces the horse to release the bites and suppresses the wind sucking. At the same time, the horse cannot be choked and it is not injured by the device.

The novel features of the present invention are defined in the appended claims. The invention itself will be best understood from the following description of a preferred embodiment which is accompanied by the following drawings.

DESCRIPTION OF PREFERRED EMBODIMENTS

Figure 1:
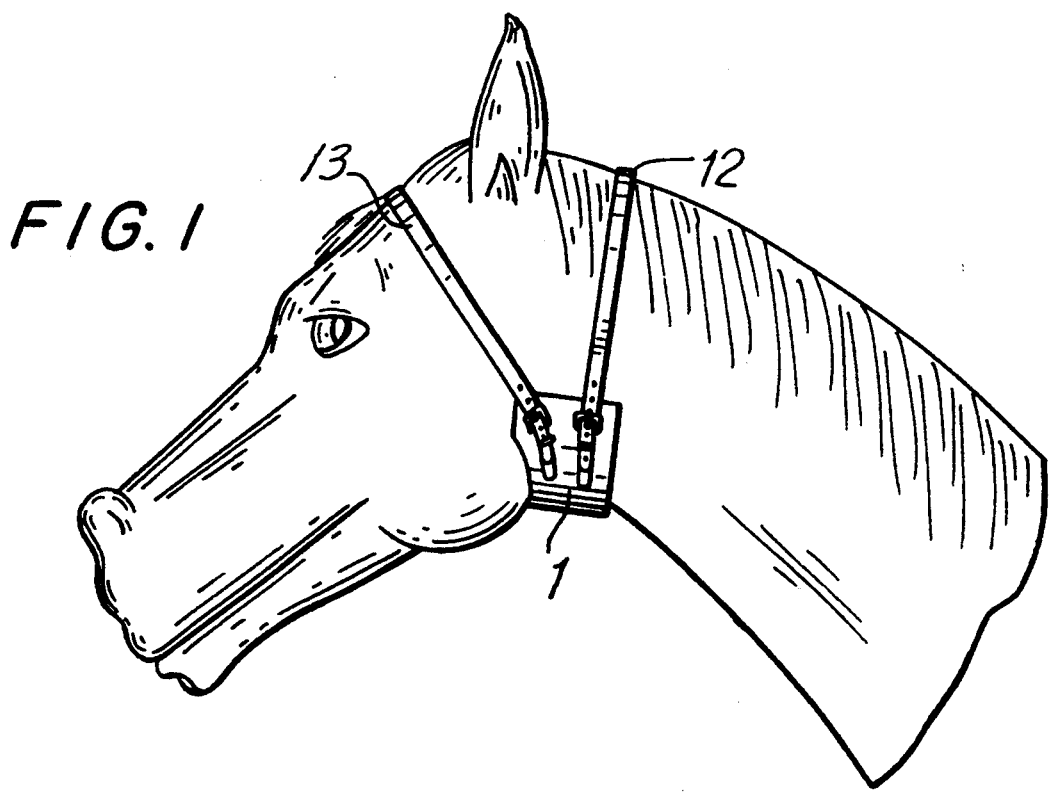
FIG. 1 is a view showing schematically a device for preventing wind sucking applied on a horse.
Figure 2:
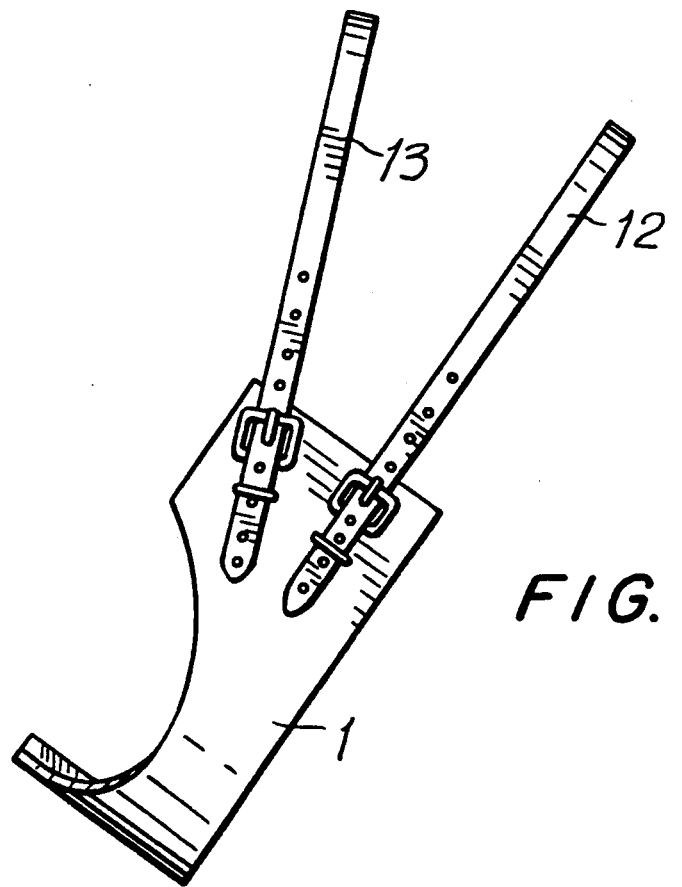
FIG. 2 is a side view of the device for preventing wind sucking in accordance with the present invention, on an enlarged scale.
Figure 3:
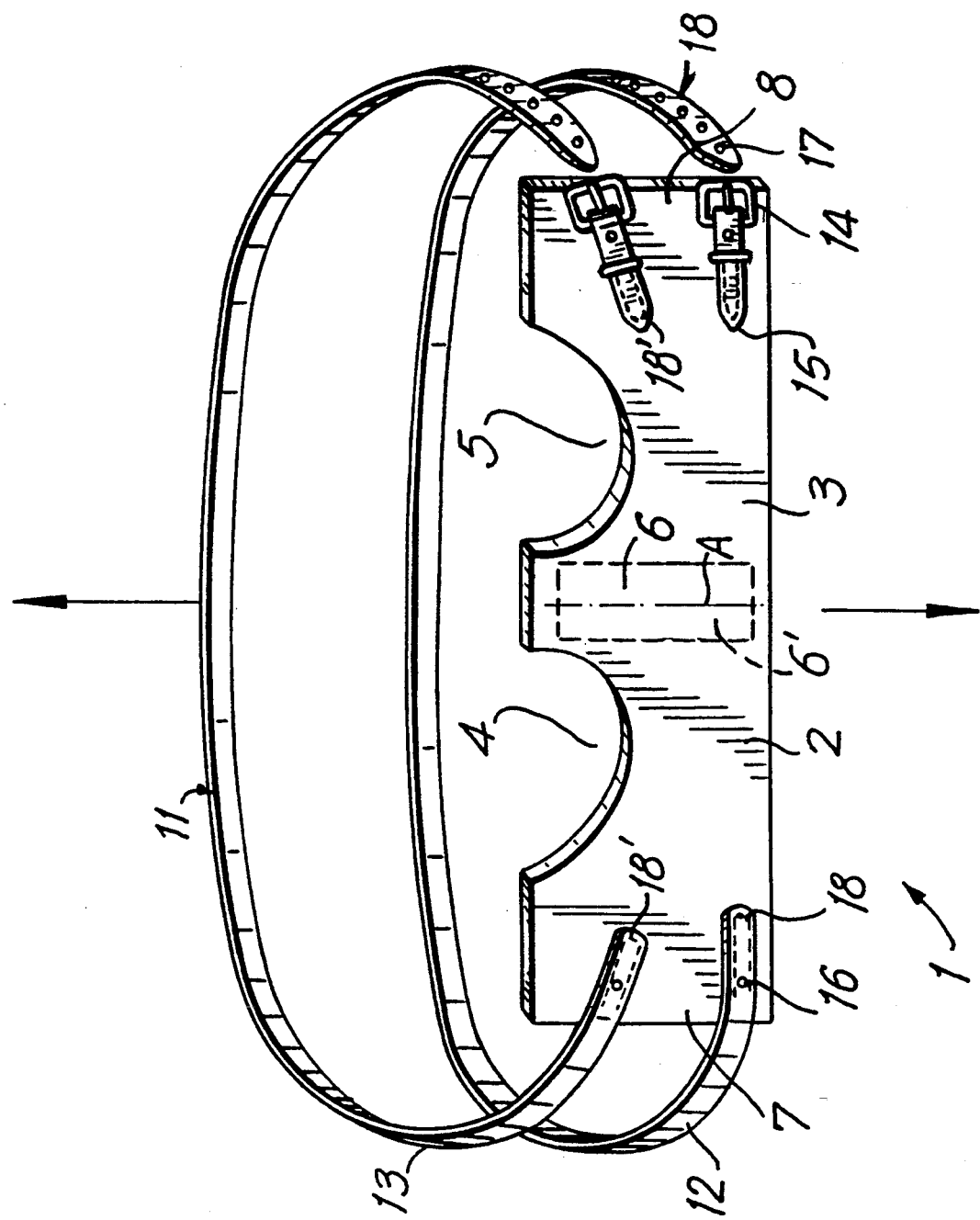
FIG. 3 is a front view of the inventive device for preventing wind sucking by a horse.

A device for preventing wind sucking by a horse has a main part which is identified as a whole with reference numeral 1 and composed of a flexible material, for example leather. The main part 1 is to be applied on the front outer surface of a horse throat.

The main part 1 has two side portions 2 and 3 each having a cavity 4 and 5 correspondingly. Each cavity opens upwardly and extends downwardly in an applied position of the main part. Each cavity has a shape which substantially corresponds to the contour of the horse jawbone. In particular the inner part of the cavity bottom is substantially round while the outerpart of the cavity bottom extends as a curve of a greater diameter. The main part has a central portion 6 located centrally between the side portions 2 and 3 and extending upwardly. The main part 1 further has two end portions 7 and 8 located laterally outwardly of the side portions 2 and 3. The end portions 7 and 8 are substantially rectangular, preferably square, and have rounded corners. The main part 1 is symmetrical relative to its central vertical axis, so that the side portions 2,3, the cavities 4,5 and the end portions 7,8 are symmetrical relative to and equidistant from the central vertical axis A. The upper surfaces of the central portion 6 and the end portions 7 and 8 are located at a same distance from and extend parallel to the lower surface of the main part. The main part is formed as a one-piece member.

The device further has an element 11 for releasably fixing and tightening the main part 1 on the horse throat. The element 11 includes two straps 12 and 13 each having one end fixedly connected to the end portion of the main part and another end releasably connected to another end portion of the main part. The releasable connection can be obtained by providing a buckle 14 attached to a piece 15 which is for example fixed to the main part by a rivet 16, and a plurality of holes 17 provided on the end portion of each strap. As can be seen from the drawings, the straps are spaced from one another in a vertical direction. The end portions 18 at one side and at the other side of the lower strap 12 extend parallel to the direction of elongation of the main part 1 or parallel to its upper and lower surfaces. In contrast, the end portions 18' of the upper strap 13 extend at an acute angle to the lower strap 12 and upwardly out of the plane of the upper end surface of the main part.

In operation, the main part 1 is applied to the outer front surface of the horse throat so that the cavities follow the contour of the jawbones, the end portions 7 and 8 are located on the cheeks, and the central portion is located in the center of the throat. Then the straps are applied around the neck and the head correspondingly, and tightened. As a result, an inward and upward pressure is applied by the central portion 6 of the main part 1 to the throat, which as explained above inhibits wind sucking by a horse. At the same time, the horse cannot be choked and injured by the device.

The main body part can be composed of two identical layers connected with one another for example by stitching. A rigidifyign insert 6' can be arranged between the layers in the region of the central portion 6'.

The invention is not limited to the details shown since various modifications and structural changes are possible without departing in any way from the spirit of the present invention.

What is desired to be protected by Letters Patent is set forth in particular in the appended claims.

We claim:

1. A device for preventing horse wind sucking, comprising a main part applicable onto a front outer surface of a horse throat, said main part including two side portions each having a cavity which opens upwardly and reduces downwardly in an applied condition of the main part so that each of the cavities conforms to a horse jawbone so that in the applied condition said main part is reliably oriented by the horse jawbones, and a central portion located centrally between said two side portions and projecting upwardly so that in the applied condition said central portion applies an inward pressure and an upward pressure to the horse throat; and means for removably fixing and tightening said main part on a horse head and including an element which extends from opposite ends of said main part and is formed to surround a part of the horse, each of said cavities having a laterally inner portion with a smaller radius and a laterally outer portion with a greater radius.

2. A device as defined in claim 1, wherein said main part has a vertical central axis and is symmetrical relative to said vertical central axis so that said cavities are located at opposite sides of said vertical central axis and are symmetrical relative to the latter.

3. A device as defined in claim 1 and further comprising two end portions each located outwardly laterally of a respective one of said side portions and formed to be applied on horse cheeks.

4. A device as defined in claim 3, wherein said end portions are substantially rectangular and have rounded outer corners.

5. A device as defined in claim 3, wherein said main part including said end portions, said side portions and said central portion is formed as a one piece member.

6. A device as defined in claim 3, wherein said main part has a lower surface, said central portion and said end portions having upper surfaces which are located at a same height from and extend parallel to said lower surface of said main part, said end portions having lateral surfaces extending perpendicular to said upper and lower surfaces.

7. A device as defined in claim 1, wherein said main part including said side portions and said central portion is a formed as a one piece member.

8. A device as defined in claim 1, wherein said element includes two straps located one above the other and each having one section fixedly connected with said main part and another section releasably connected with said main part, said straps being arranged so that one of said straps can surround the horse's neck while another of said straps can surround the horse head.

9. A device as defined in claim 8, wherein each of said straps has two ends, said one section being formed by one of said ends while said another section is formed by another of said ends.

10. A device as defined in claim 8, wherein said sections of one of said straps extend at an angle relative to said sections of another of said straps.

11. A device as defined in claim 10, wherein said main part has upper and lower surfaces, said sections of one of said straps extending parallel to said surfaces with said sections of another of said straps extending upwardly out of a plane of said upper surface.

* * * * *